May 3, 1955 E. E. PRATHER 2,707,541
CLUTCH CONTROL MECHANISM
Original Filed Sept. 30, 1948 2 Sheets-Sheet 1

INVENTOR.
EDWIN E. PRATHER
BY
H. O. Clayton
ATTORNEY

May 3, 1955   E. E. PRATHER   2,707,541
CLUTCH CONTROL MECHANISM
Original Filed Sept. 30, 1948   2 Sheets-Sheet 2

INVENTOR.
EDWIN E. PRATHER
BY
H. O. Clayton
ATTORNEY

United States Patent Office 2,707,541
Patented May 3, 1955

2,707,541

CLUTCH CONTROL MECHANISM

Edwin E. Prather, South Bend, Ind., assignor to Bendix Aviation Corporation, South Bend, Ind., a corporation of Delaware Original application September 30, 1948, Serial No. 52,087. Divided and this application June 12, 1951, Serial No. 231,200

1 Claim. (Cl. 192—91)

This invention relates in general to power means for operating the friction clutch of an automotive vehicle and in particular to a clutch operating pressure differential operated power means controlled in part by an operation of the engine of the vehicle.

One of the principal objects of my invention is to provide a clutch control mechanism including a pressure differential operated motor controlled by valve mechanisms including a three-way pressure balanced follow-up valve which is operative in accordance with the speed of the engine.

Another object of my invention is to provide, in the power plant of an automotive vehicle including a friction clutch, a change speed transmission, and an accelerator, a vacuum operated clutch control mechanism comprising a single acting motor, said motor being controlled in part by a pressure balanced three-way valve which is actuated by means including a pressure differential operated motor the operation of the valve being also controlled in part by another pressure differential operated motor.

Yet another object of my invention is to provide power means for operating the friction clutch of an automotive vehicle said power means serving to effect two stages of clutch engaging movement of the driven element of the clutch as it moves into engagement with the driving element of the clutch said two stage operation of the clutch driven element being effected by a throttle opening movement of the accelerator and by engine speed controlled means.

Yet another object of my invention is to provide, in the power plant of an automotive vehicle including a friction clutch, an accelerator, and a three-speeds forward and reverse transmission, power means for operating the clutch including a pressure differential operated motor operatively connected to the clutch, valve means for controlling the operation of said motor including a three-way valve controlled by a vehicle speed responsive governor, the accelerator and the change speed transmission, and further including a three-way bleed valve controlled by the accelerator and a plurality of pressure differential operated motors; said power means being operative to disengage the clutch by the release of the accelerator when the transmission is established in any gear except high gear and also operative to disengage the clutch, when the transmission is established in high gear, by the operation of the governor and the accelerator.

Yet another object of my invention is to provide a clutch control mechanism adapted to be used in the power plant of an automotive vehicle, said mechanism including a pressure differential operated motor controlled by a valve mechanism which is automatically operative to effect a clutch plate loading operation of the clutch control mechanism the degree of loading being dependent upon factors including the degree of gaseous pressure within the intake manifold of the engine of the vehicle and the speed of said engine, the mechanism being automatically operative to quickly and substantially increase the loading of the clutch plates when the engine speed is suddenly increased.

Yet another object of my invention is to provide power means for operating the friction clutch of an automotive vehicle said power means including a single acting pressure differential operated motor controlled by a power operated three-way valve having fluid transmitting connections with the atmosphere, a source of vacuum, and the motor, the connection with the atmosphere being controlled by a power operated three-way valve operable to control the gaseous pressure within the motor in its operation of controlling the engagement of the clutch.

A further object of my invention is to provide a pressure balanced valve mechanism adapted to be included as part of the mechanism for operating the friction clutch of an automotive vehicle said valve mechanism including a three-part three-way valve two of the parts of the latter valve being power operated.

Yet another object of my invention is to provide, in a power operated clutch control mechanism for operating the friction clutch of an automotive vehicle, a pressure balanced three-way valve mechanism operative in part by a pressure differential operated motor which is operative to effect a clutch engaging operation of the valve mechanism when the intake manifold vacuum of the engine of the vehicle is suddenly decreased.

The above and other objects and features of the invention will appear more fully hereinafter from a consideration of the following description taken in consideration with the accompanying drawings wherein one embodiment of the invention is illustrated by way of example.

Figure 1:
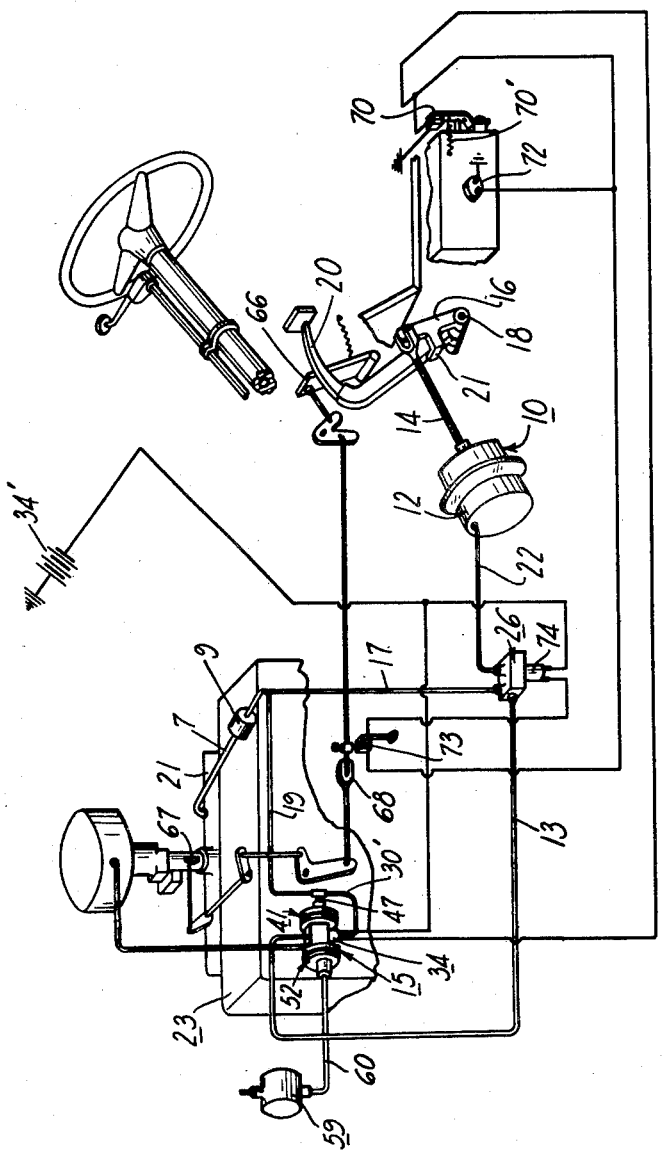
Figure 1 is a diagrammatic view disclosing the clutch control mechanism of my invention.

Describing now that embodiment of my invention disclosed in the several figures of the drawings the principal elements thereof consist of a single acting vacuum motor 10 comprising a casing 12 and a power element such as a piston, not shown, which is connected to a friction clutch, not shown, of a conventional design, that is one including driving and driven elements. One end of the casing of the motor, a portion of the body thereof and the power element together outline a control chamber, the gaseous pressure within said chamber being controlled to control the operation of the motor. The force transmitting means interconnecting the power element of the motor with the clutch preferably includes a flexible cable 14 connected to a crank 16 and said crank is fixedly connected to a shaft 18 which is connected to the clutch. A foot operated clutch pedal 20, contactable with a flange 21 extending from the crank 16, is also preferably included in the clutch operating mechanism.

Figure 2:
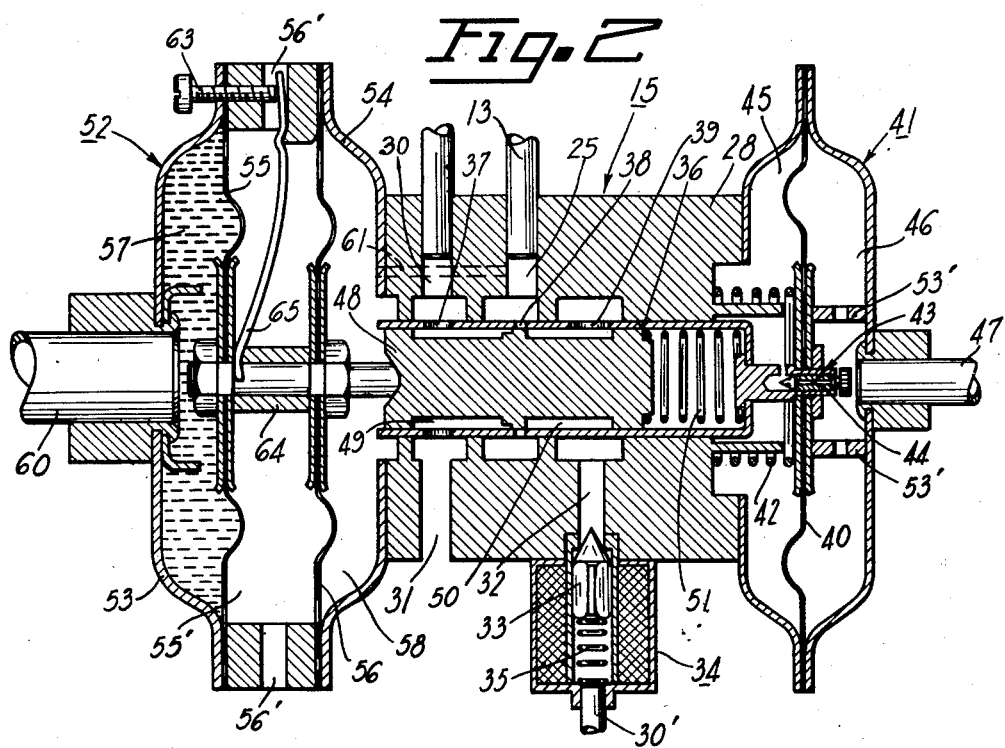
Figure 2 is a longitudinal view of the three-part three-way bleed valve mechanism constituting the principal feature of my invention.
Figure 3:
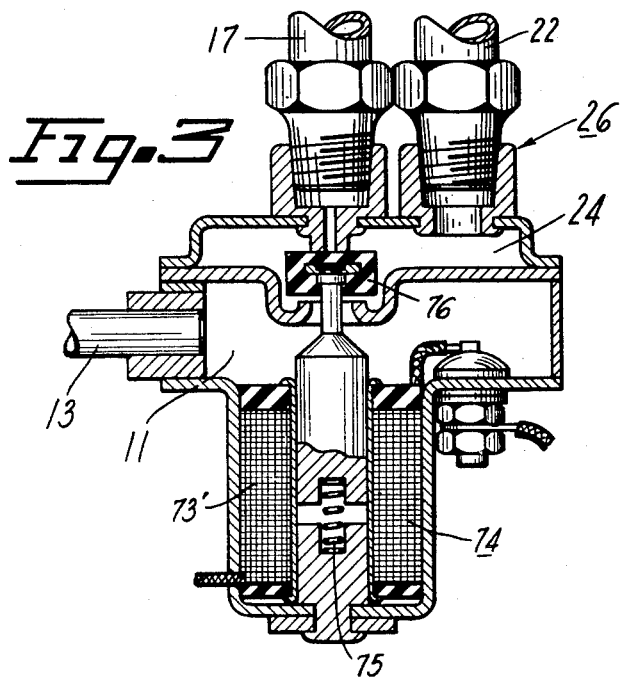
Figure 3 is a sectional view disclosing details of the power operated three-way valve of my invention.

One end of the motor 10, that is, the end of the same constituting a part of the aforementioned power compartment of the motor, is connected by a conduit 22 to a compartment 24 of a power operated three-way valve unit indicated as a whole by the reference numeral 26 and disclosed in detail in Figure 3. A compartment 11 of said three-way valve unit 26 is connected, by a conduit 13, with a port 25 of a power operated three-part three-way bleed control valve unit indicated as a whole in Figures 1 and 2 by the reference numeral 15; and the aforementioned compartment 24 is connected, by a conduit 17, with a conduit 19 which conduit interconnects the air bleed valve 15 with a vacuum tank 9 said tank being connected, by a conduit 7, with the intake manifold 21 of the internal combustion engine 23 of the vehicle.

Describing now the details of the power operated three-way bleed valve 15 the casing 28 of said valve, constituting one of the three parts thereof, is provided with ports 30 and 31 venting the interior of the valve to the atmosphere; and said casing is also provided with a port 32 adapted to be connected with the vacuum tank 9 by means of a conduit 30'. As is disclosed in Figure 1 the latter conduit is connected to the conduit 19. As is disclosed in Figure 2 the base of each of the ports 25, 30, 31, and 32 is connected with an annular recess within the valve casing. The vacuum connection to the port 32 is controlled by a power operated vacuum cut-in valve 33; and the power means for operating the latter valve includes a solenoid 34 and a spring 35 the valve being biased to its closed position by the spring and opened by the solenoid when the latter is energized.

The valve casing is bored to receive a sleeve 36 constituting a second part of the three-part bleed valve said sleeve being provided with ports 37, 38, and 39 adapted to register respectively, with the aforementioned recesses registering with the valve ports 30, 25, and 32. The sleeve 36 is actuated by the power element 40 of a pressure differential operated vacuum suspended motor 41; and one of the two parts of the casing of said motor is fixedly secured to the valve casing 28. A spring 42 within the motor 41 serves to move the power element 40 into contact with stop 53' secured to the outer section of the motor 41; and an adjustable bleed valve 43 serves to control the flow of air through a duct 44 said duct interconnecting chambers 45 and 46 of said motor. A conduit 47 serves to interconnect the motor chamber 46 with the vacuum conduit 19. Completing the description of the bleed valve 15 the third part thereof consists of a spool shaped member 48 slidingly mounted within the valve sleeve 36 said member being provided with recesses 49 and 50 adapted to register respectively, with valve ports 37 and 39 in the valve sleeve 38; and as will be brought out in the description to follow one or the other of the recesses 49 and 50 is registrable with the port 38. A spring 51, interposed between one end of the sleeve 36 and one end of the valve member 48, serves to bias the latter member to a position whereby the port 38 registers with the recess 50.

Describing now the power means for actuating the valve member 48 there is provided a two motored pressure differential operated motor unit 52 comprising casing members 53 and 54 having secured between them power elements 55 and 56. The motor casing member 54 is secured to the valve casing 28 thereby mounting the power unit 52 in position to actuate the valve member 48. A central chamber 55' of the unit 52 is vented to the atmosphere via ports 56', and compartments 57 and 58 of said unit are connected respectively to an engine driven water pump 59, Figure 1, and the valve port 25, via a conduit 60 and a duct 61 in the body of the valve casing 28 the duct 61 being disclosed in dotted lines in Figure 2. A leaf spring 65, the tension of which may be adjusted by a set screw 63, serves to bias the power elements 55 and 56 to the left, Figure 2. A pin 64, interconnecting the power elements 55 and 56, abuts one end of the valve member 48 the latter being moved into contact with said pin by the spring 51.

There is provided, by the unit 52, power means for actuating the valve member 48 to provide a pressure balanced three-way bleed valve. The force exerted by the pressure differential operated power elements 55 and 56 operate in one direction, that is to the right, Figure 2, to balance the force exerted by the spring 51 in the opposite direction.

Completing the description of the clutch control mechanism constituting my invention the accelerator 66 of the vehicle is connected to a throttle operating crank 67 by the several links and bell crank levers disclosed in Figure 1; and as will appear from the description to follow one feature of my invention lies in the provision of a lost motion connection 68 in this throttle to accelerator connection.

Describing now the electrical control mechanism of my invention, as is disclosed in Figure 1, the solenoid 34, which together with the spring 35 operates the vaccum cut-in valve 33, is controlled by a grounded shift rail operated switch 70 and by a grounded vehicle speed responsive governor operated switch 72 which is electrically connected in parallel with the switch 70. The latter switch is biased to its closed position by a spring 70', and is opened by the transmission, preferably the second and high gear shift rail thereof, when the transmission is established in its high gear setting. The armature 73' of a solenoid 74 is operative to actuate a valve member 76 of the three-way valve 26 said armature being controlled by the aforementioned grounded switches 70 and 72 and by an accelerator operated breaker switch 73. As is disclosed in Figure 1 the latter switch is electrically connected in series with the solenoid 74 and the switches 70 and 72. The construction of the switch 73 and its connection with the accelerator is such that the same is closed when the accelerator is released and opened just prior to taking up all of the lost motion of the connection 68. As is disclosed in Figure 1 the solenoids 34 and 74 are electrically connected to the grounded battery 34' providing a source of electrical energy for the electrical controls of my invention.

Describing now the complete operation of the mechanism constituting my invention and incidentally completing the description of parts thereof not heretofore described, when the accelerator 66 is released to close the throttle of the internal combustion engine 23, the intake manifold 21 of said engine is partially evacuated to in turn evacuate the vacuum tank 9. There is thus provided a source of vacuum for energizing the motor 10 to disengage the friction clutch of the vehicle; and this operation is effected with the release of the accelerator to close the switch 73, and either a closing of the transmission controlled switch 70 or a slowing down of the vehicle below governor speed to close the switch 72, either of said operations effecting an energization of the solenoid 74 to open the valve 76. It is to be noted here that the parts of the mechanism are so constructed and arranged that the bleed valve 15 and the means for operating the same assume, at this time, the relative positions disclosed in Figure 2. Explaining the latter operation when the valve 76 is opened as a result of the energization of the solenoid 74 the motor 10 is energized to disengage the clutch; and at the same time the solenoid 34 is energized to open the vacuum cut-in valve 33 thereby connecting the valve port 32 with the source of vacuum the latter operation resulting in an energization of the motor 52 to move the valve member 48 to the right to its lapped position that is the position disclosed in Figure 2. The several forces acting upon the valve member 48 to effect this lapping operation are described in detail hereinafter.

To initiate a clutch engaging operation of the power means of my invention, that is effect the first stage of clutch engaging operation of the motor 10, the driver depresses the accelerator to open the switch 73 it being remembered that the throttle is not opened during this operation; and said operation effects a de-energization of the solenoid 74 thereby permitting a spring 75 to close the valve 76, that is connect the control compartment of the motor 10 with the port 25 of the bleed valve 15 via the conduits 13 and 22. A continued depression of the accelerator serves to open the throttle and this operation serves, by virtue of the increase in pressure exerted by the fluid in the compartment 57, to again move the valve member 48 to the right thereby venting the compartment 58 to the atmosphere. Assuming that the driver then momentarily arrests the throttle opening movement of the accelerator the valve member 48 will then be moved to the left to again lap the valve this operation being effected by the reduction of the pressure acting to move the diaphragm 55 to the right, and the resultant operation of the spring 65 in its operation of biasing the valve member 48 to the left.

As to this valve lapping first stage operation an important feature of my invention lies in the construction, arrangement and adjustment of the parts of the valve 15, including the setting of the spring 65 and the force exerted by the water within the compartment 57 to automatically effect this operation of the valve; and it is to be remembered that during the operation of engaging the clutch, that is the operation now being described, the gaseous pressure within the compartment 58 of the unit 52 and the gaseous pressure within the control compartment of the motor 10 are the same at all times. The parts of the mechanism are preferably so constructed and arranged and so operative that the first stage of the clutch engaging operation, that is movement of the driving clutch plate, is terminated just prior to the contacting of the clutch plates; and the valve 48 is automatically lapped when this occurs.

Now to effect the all important controlled engagement of the clutch plates, that is to effect the second stage clutch engaging operation of the power means of my invention, the driver continues the depression of the accelerator thereby effecting an opening of the throttle to speed up the engine; and this operation results in an increase in the force exerted by the engine driven water pump 59 with a resultant increase in the pressure exerted by the water within the compartment 57 of the motor 52; and this results in a movement of the valve member 48 to the right to again vent the motor 10 and the valve compartment 58 to the atmosphere. This results in a reduction of the differential of pressures acting upon the power element of the motor 10 with a resultant loading of the clutch plates by the expanding operation of the clutch springs. Then when the gaseous pressure within the compartment 58 is increased sufficiently to make the force exerted by the power element 56 plus the force exerted by the power element 55 equal to the force exerted by the spring 65, the valve 48 is again lapped. The power elements 55 and 56 and the spring 65 of the motor unit 52 constitutes three separate sources of energy serving to operate the valve member 48.

It is apparent therefore that there is provided, by the three-part three-way bleed control valve 15 of my invention, means for effecting a clutch plate loading which is directly proportional to the speed of the engine and this is exactly the result desired for the clutch plate loading should increase proportionately with the increase in engine torque. It is to be particularly noted that in the mechanism of my invention the summation of the loads exerted by the power element 56 and the pump operated power element 55 always equals the force exerted by the spring 65 to effect a lapping of the valve 48. As the load exerted by the pump 59 increases the load of the power element 56 decreases, the force exerted by the spring 65 remaining a constant; for with an increase in the former load the valve 48 is pushed to the right, Figure 2, to vent the compartment 58 to the atmosphere; and when this occurs the differential of pressures acting on the power element 56 is lowered. It follows therefore that when the driver wishes to increase the clutch plate loading said operation may be effected merely by depressing the accelerator to increase the speed of the engine; for this operation results in a proportionately greater energization of the water pump 59 with a resulting expansion of the clutch springs to increase the clutch plate loading.

A feature of my invention lies in the operation of the governor controlled vacuum cut-in valve 33; for it is to be noted that after the valve 48 is lapped should the speed of the engine be reduced, i. e. if the engine labors, then the three forces maintaining said valve lapped will be unbalanced resulting in a movement of the valve 48 to the left, Figure 2, to uncover the port 38 and reconnect the motor 10 with the source of vacuum, that is the tank 9, said tank insuring a source of vacuum at all times during the operation of the clutch control mechanism of my invention. This operation of the valve 15 will, of course, through the resultant increase in energization of the motor 10, result in a lessening of the then existing clutch plate load, that is the load causing the engine to labor.

Now the vacuum connection with the valve port 32, Figure 2, is controlled by the vacuum cut-in valve 33 the operation of which, by virtue of the electrical means disclosed in Figure 1, is controlled in part by the vehicle speed responsive governor, not shown. Below governor speed, and with the accelerator released to close the switch 73, the governor operated switch 72 is closed to energize the solenoid 74 to open the valve 33 accordingly it follows that the above described what may be termed recovery operation of the clutch control operation is only possible when the vehicle is traveling below governor speed; but with normal driving the engine torque is relatively high when the vehicle is traveling at a fairly high speed, that is above governor speed; accordingly, the above described recovery of the mechanism is not needed at this time.

The most important feature of my invention lies in the provision of the pressure differential operated vacuum suspended motor 41; for with the inclusion of this motor in the mechanism there is provided power means for effecting the desired engagement of the clutch when the speed of the engine is suddenly increased. Explaining the difficulty to be overcome, and assuming for the moment that the mechanism does not include the motor 41, should the driver suddenly increase the engine speed by say tramping hard upon the accelerator it would be necessary at this time to effect a corresponding substantial increase in the clutch plate loading; for otherwise the clutch would slip and the desired acceleration of the vehicle would not be obtained. With the motor 41 omitted from the mechanism of Figure 2 this quick opening of the throttle would not result in a concurrent proportional increase in the clutch plate loading; this for the reason that due to frictional resistance to the movement of the air in the several conduits, the factor of inertia, and other factors, there would be a lag in the right-ward movement of the valve member 48. But with the motor 41 included in the mechanism this relatively high factor of acceleration of engine speed immediately results in a substantial increase in the gaseous pressure within the compartment 46 of said motor. For it is to be remembered that the latter compartment is directly connected to the intake manifold 21 of the engine and when the throttle valve is opened wide to increase the engine speed there results a substantial decrease in the vacuum of the intake manifold, that is substantial increase in the gaseous pressure within said manifold. Now there is very little resistance to flow of air from the manifold to the motor compartment 46 accordingly the substantial increase in gaseous pressure within the manifold 21 is immediately followed by a corresponding increase in the gaseous pressure within the motor compartment 46.

Explaining the operation of the motor 41 it is to be noted that normally the gaseous pressure within the motor compartment 45 is equal to the pressure within the compartment 46 of the motor and that when the pressure within the latter compartment is suddenly increased as explained above, there results a movement of the diaphragm 40 to the left, Figure 2; for said diaphragm is then subjected to a differential of pressures inasmuch as the bleed valve 43 operates to retard the flow of air from the compartment 46 to the compartment 45. The leftward movement of the diaphragm 40 results in a leftward movement of the valve sleeve 36 to uncover the port 38 and connect the same with the recess 49 in the valve member 48.

It follows therefore that the mechanism of my invention when the driver suddenly opens the throttle the bleed valve 15 is immediately operated by the motor 41 to substantially increase the clutch plate loading exerted by the clutch springs. However, with a normal operation of the vehicle the motor 41 does not come into play the control being effected entirely by the motor unit 52.

There is thus provided a simple and compact clutch control mechanism the clutch being automatically disengaged when the accelerator is released to close the switch 73 and either the speed of the car is reduced below a certain factor to operate the governor operated switch 72 or the transmission is operating in any setting except high gear said setting resulting in a closing of the switch 70. The clutch is subsequently re-engaged in two stages when the accelerator is depressed to open the throttle the clutch loading during said engagement being proportional to the engine speed; and with the mechanism of my invention the clutch is automatically disengaged to terminate an undesired laboring of the engine; furthermore, with the mechanism of my invention the clutch is quickly engaged, to prevent a slipping clutch action, when the driver suddenly opens the engine throttle.

Although only one embodiment of the invention has been illustrated and described, various changes in the form and relative arrangements of the parts may be made to suit requirements.

This application constitutes a division of my application No. 52,087, filed September 30, 1948, and now Patent No. 2,601,626.

I claim:

A clutch control mechanism comprising a single-acting pressure differential operated motor adapted to be connected to a clutch and a control mechanism for said motor comprising a manually controlled power operated three-way valve, a power operated three-way bleed valve operable to control the flow of air into the motor and from the motor via the three-way valve, fluid transmitting means removed from the bleed valve and adapted to connect the power operated three-way valve with a source of vacuum, fluid transmitting means removed from the aforementioned fluid transmitting means and connecting the power operated three-way valve with the motor, other fluid transmitting means interconnecting the power operated three-way valve with the power operated three-way bleed valve, and power means for operating the latter valve including a vacuum suspended pressure differential operated motor.

References Cited in the file of this patent
UNITED STATES PATENTS

| | | |
|---|---|---|
| 1,999,366 | Maybach | Apr. 30, 1935 |
| 2,049,738 | Hill et al. | Aug. 4, 1936 |
| 2,095,779 | Whittington | Oct. 12, 1937 |
| 2,098,674 | Price et al. | Nov. 9, 1937 |
| 2,105,429 | Maybach | Jan. 11, 1938 |
| 2,144,034 | Sanford | Jan. 17, 1939 |
| 2,587,524 | Price | Feb. 26, 1952 |